Feb. 28, 1933.   P. G. JOHNSON   1,899,695
PIPE JOINT
Filed March 15, 1932
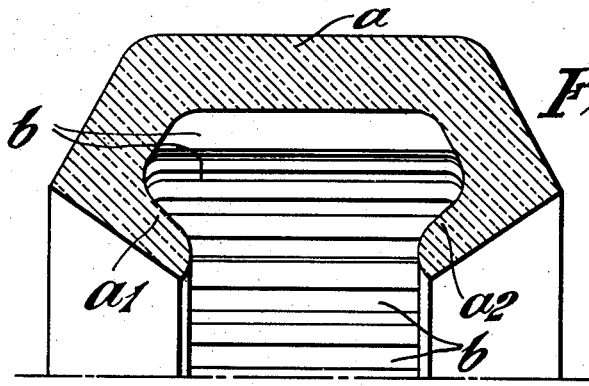
Fig.1.
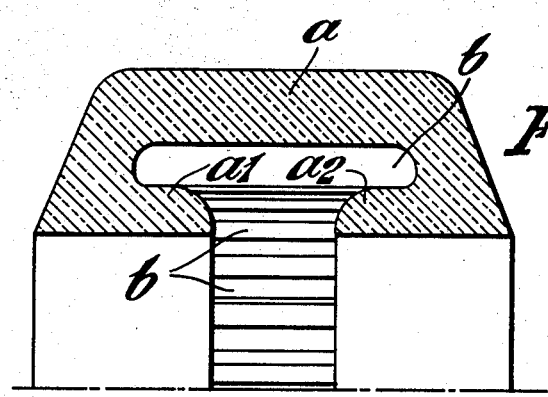
Fig.2.
Fig.3.   Fig.4.
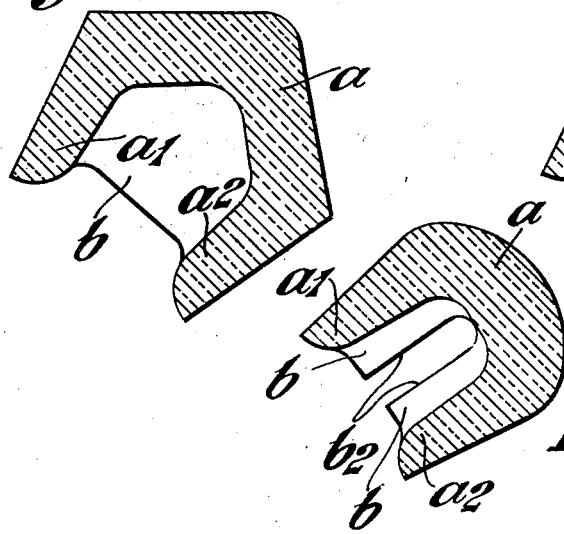
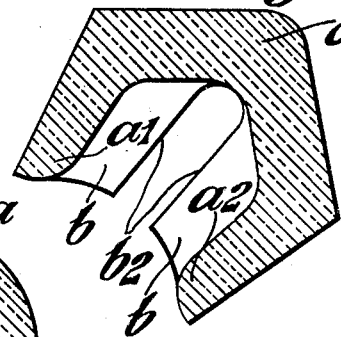
Fig.5.
INVENTOR
P. G. Johnson
By Robt R Cobb
ATTORNEYS Patented Feb. 28, 1933

1,899,695

UNITED STATES PATENT OFFICE

PERCY GRAHAM JOHNSON, OF LETCHWORTH, ENGLAND, ASSIGNOR TO VICTAULIC COMPANY LIMITED, OF LONDON, ENGLAND

PIPE JOINT

Application filed March 15, 1932, Serial No. 599,019, and in Great Britain August 10, 1931.

This invention relates to pipe joints and has reference to fluid sealed pipe joint rings of rubber or other suitable flexible material of the general character described in my prior U. S. A. Patent Nos. 1,541,601 and 1,701,326.

In the latter patent there is disclosed a proposal for providing within the ring joint a number of transverse ribs adapted to stiffen the sealing lips of the joint.

According to the present invention the ribs arranged transversely in the ring are so constructed that the free edge of each transverse rib comes into contact with and exerts any desired pressure on a supporting member, only when the joint ring is applied to the pipes.

The rib supporting member may be the inturned lips of the ring, or the bent over ends of the rib itself, according to the kind of joint to which the ring is to be applied.

Two methods of carrying out the invention are illustrated by the accompanying drawing, wherein Figure 1 is a section of the ring before it is applied to a pipe, Figure 2 is the same section after application to a pipe, while Figures 3, 4 and 5 are sections of similar rings designed for packing rings of the kind used in spigot and socket pipe joints.

In the drawing $a$ is the material of the packing ring, $a1$ and $a2$ are the inturned lips of the ring which when in the joint are sealable by fluid pressure, $b, b,$ are the transverse ribs, $b1, b1$ the free edges of the ribs $b2, b2$ gaps extending the full length of the rib. The free edge $b1, b1$ of the ribs in Figures 1 and 2 extend the full width of the section of the inside.

The sections shown in Figures 1 and 2 are for packing rings used in those forms of joint where the pipes joined by the ring joint are in alignment, or substantially so, the ribs $b$ take the form of transverse bars formed on the inner periphery of the ring $a$, but unlike the arrangement disclosed in my prior U. S. A. Patent No. 1,701,326 these bars do not extend to the sealing lips $a1$ and $a2$ but come into operation therewith only when the joint is applied to a pipe whereupon the stiffening ribs or bars $b, b$ come into contact with the backs of the sealing lips $a1, a2$ and assist in the initial sealing operation which is thereafter augmented by the pressure with the pipes in the manner well known with this type of joint.

The sections shown in Figures 3, 4 and 5 are for packing rings used in joints such as are described in prior U. S. A Patent No. 1,683,076, for spigot and socket pipe connections the same effect may be best obtained by providing gaps $b2, b2$ in the ribs $b$ which divide them in the centre, so that there are in effect opposed ribs on each internal wall which come together and abut when the ring joint is applied.

In this connection it may possibly be advantageous to divide the transverse ribs or bars $b$ before referred to in connection with joints for aligned pipes having rings as in Figures 1 and 2. Similarly in some cases the angle type ring may be provided with undivided ribs extending from one sealing flange or lip to the other as in Figure 3.

What I claim and desire to secure by Letters Patent is:—

1. A hollow pipe joint sealing ring of flexible material having an opening which when in position in the joint is open to fluid pressure from the pipes so as to be sealed thereby, comprising a hollow ring having an opening on its inner side and of which the edges form sealing lips, and a plurality of transverse ribs formed on its inner surface, the ribs being shaped to exert mechanical pressure on the full width of the lips only when in position on the joint and force them on their bearing surfaces in the joint by contact pressure independently of the fluid pressure.

2. A hollow pipe joint sealing ring of flexible material having an opening which when in position in the joint is open to fluid pressure from the pipes so as to be sealed thereby, comprising a hollow ring having an opening on its inner side and of which the edges form sealing lips, and a plurality of transverse ribs formed on its inner surface and extending from side to side of the inside of the ring above and independently of the lips, the ribs being shaped to exert mechanical pressure on the full width of the lips only when in position on the joint and force the lips on their bearing surfaces in the joint by contact pressure independently of the fluid pressure.

3. A hollow pipe joint sealing ring of flexible material having an opening which when in position in the joint is open to fluid pressure from the pipes so as to be sealed thereby, comprising a hollow ring having an opening on its inner side and of which the edges form sealing lips, and a plurality of transverse ribs formed on its inner surface, the ribs having a gap in their central portion and being shaped to exert mechanical pressure on the full width of the lips only when in position on the joint and force them on their bearing surfaces in the joint by contact pressure independently of the fluid pressure.

4. A hollow pipe joint sealing ring of flexible material having an opening which when in position in the joint is open to fluid pressure from the pipes so as to be sealed thereby, comprising a hollow ring having an opening of which the edges form sealing lips arranged at an angle to one another, a plurality of transverse ribs formed on its inner surface and extending from lip to lip to the inner surface of ring, the ribs being so shaped that their end portions engage each other and exert mechanical pressure on the full width of the lips only when in position on the joint and force the lips on their bearing surfaces in the joint by contact pressure independently of the fluid pressure.

In testimony whereof, I affix my signature.

PERCY GRAHAM JOHNSON.